US008769553B2

(12) United States Patent
Nigam

(10) Patent No.: US 8,769,553 B2
(45) Date of Patent: Jul. 1, 2014

(54) DEPLOY ANYWHERE FRAMEWORK FOR HETEROGENEOUS MOBILE APPLICATION DEVELOPMENT

(75) Inventor: Samir Nigam, San Ramon, CA (US)

(73) Assignee: Sybase, Inc., Dublin, CA (US)

(*) Notice: Subject to any disclaimer, the term of this patent is extended or adjusted under 35 U.S.C. 154(b) by 1189 days.

(21) Appl. No.: 12/335,136

(22) Filed: Dec. 15, 2008

(65) Prior Publication Data
US 2010/0017812 A1   Jan. 21, 2010

Related U.S. Application Data

(60) Provisional application No. 61/081,872, filed on Jul. 18, 2008.

(51) Int. Cl.
G06F 9/44       (2006.01)
G06Q 10/00    (2012.01)

(52) U.S. Cl.
CPC ............... G06F 8/38 (2013.01); G06F 9/4443 (2013.01); G06F 8/20 (2013.01)
USPC .......................................... 719/329; 709/204

(58) Field of Classification Search
USPC .......................................................... 719/318
See application file for complete search history.

(56) References Cited

U.S. PATENT DOCUMENTS

| | | | |
|---|---|---|---|
| 6,342,907 B1 | 1/2002 | Petty et al. | |
| 6,637,022 B1 | 10/2003 | Weeren et al. | |
| 7,890,853 B2 * | 2/2011 | Neil et al. | 715/234 |
| 8,103,865 B2 * | 1/2012 | Carion et al. | 713/100 |
| 2003/0066047 A1 | 4/2003 | Watase et al. | |
| 2003/0237050 A1 * | 12/2003 | Davidov et al. | 715/513 |
| 2004/0015811 A1 * | 1/2004 | Freitas et al. | 717/100 |
| 2004/0015838 A1 | 1/2004 | Watase et al. | |
| 2004/0111518 A1 * | 6/2004 | Schuyler | 709/228 |
| 2004/0133822 A1 | 7/2004 | Yoshida et al. | |
| 2006/0236254 A1 * | 10/2006 | Mateescu et al. | 715/762 |
| 2007/0099659 A1 * | 5/2007 | Borquez et al. | 455/556.2 |
| 2007/0100648 A1 | 5/2007 | Borquez et al. | |
| 2007/0198968 A1 * | 8/2007 | Shenfield et al. | 717/104 |
| 2008/0046557 A1 * | 2/2008 | Cheng | 709/224 |

FOREIGN PATENT DOCUMENTS

| | | |
|---|---|---|
| WO | WO 00/72184 A2 | 11/2000 |
| WO | WO 03/021878 A1 | 3/2003 |

OTHER PUBLICATIONS

Licia Capra et al "Exploiting Reflection in Mobile Computing Middleware", 2002.*
Notification of Transmittal of the International Search Report and Written Opinion, dated Mar. 4, 2010, for PCT Application No. PCT/US2009/004078, 11 pages.
Extended European Search Report re: 09798283.9-1243 mailed Nov. 7, 2011.

* cited by examiner

Primary Examiner — Lechi Truong
Assistant Examiner — Abdou Seye
(74) Attorney, Agent, or Firm — Sterne, Kessler, Goldstein & Fox P.L.L.C.

(57) ABSTRACT

A system, method, and computer program product are provided for developing a portable software application. The method includes the steps of defining a project, adding a screen to the project, the screen being defined as a generic screen or a platform-specific screen, adding a component to the screen, the component being defined as a generic component or a platform-specific component, redefining the screen as a platform-specific screen when it is defined as a generic screen and one or more platform-specific components have been added to the screen, and defining an application flow from the screen to one or more additional screens.

20 Claims, 12 Drawing Sheets

720

900

DEPLOY ANYWHERE FRAMEWORK FOR HETEROGENEOUS MOBILE APPLICATION DEVELOPMENT

CROSS REFERENCE TO RELATED APPLICATIONS

This patent application claims the benefit of U.S. Provisional Patent Application No. 61/081,872, filed Jul. 18, 2008, entitled "Design Once, Deploy Anywhere Framework for Heterogeneous Mobile Application Development," which is incorporated herein by reference in its entirety.

BACKGROUND OF INVENTION

1. Field of the Invention

The present invention relates generally to software development and, more specifically, to a multi-platform application development framework.

2. Description of the Background Art

In recent years, a number of competitors have emerged in the field of mobile devices, resulting in the development of a number of incompatible hardware and software platforms. With different form factors, input and output capabilities, and operating systems, it is difficult to develop software applications that are made easily portable between these mobile devices. Often, a developer that writes a piece of software for one mobile device is required to rewrite most of the software, possibly even in a different programming language, in order to support a different mobile device.

Accordingly, what is desired is a framework to support a single design for deployment on multiple target platforms.

SUMMARY OF INVENTION

Embodiments of the invention include a method for developing a portable software application. The method includes the steps of defining a project, adding a screen to the project, the screen being defined as a generic screen or a platform-specific screen, adding a component to the screen, the component being defined as a generic component or a platform-specific component, redefining the screen as a platform-specific screen when it is defined as a generic screen and one or more platform-specific components have been added to the screen, and defining an application flow from the screen to one or more additional screens.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

Figure 1:
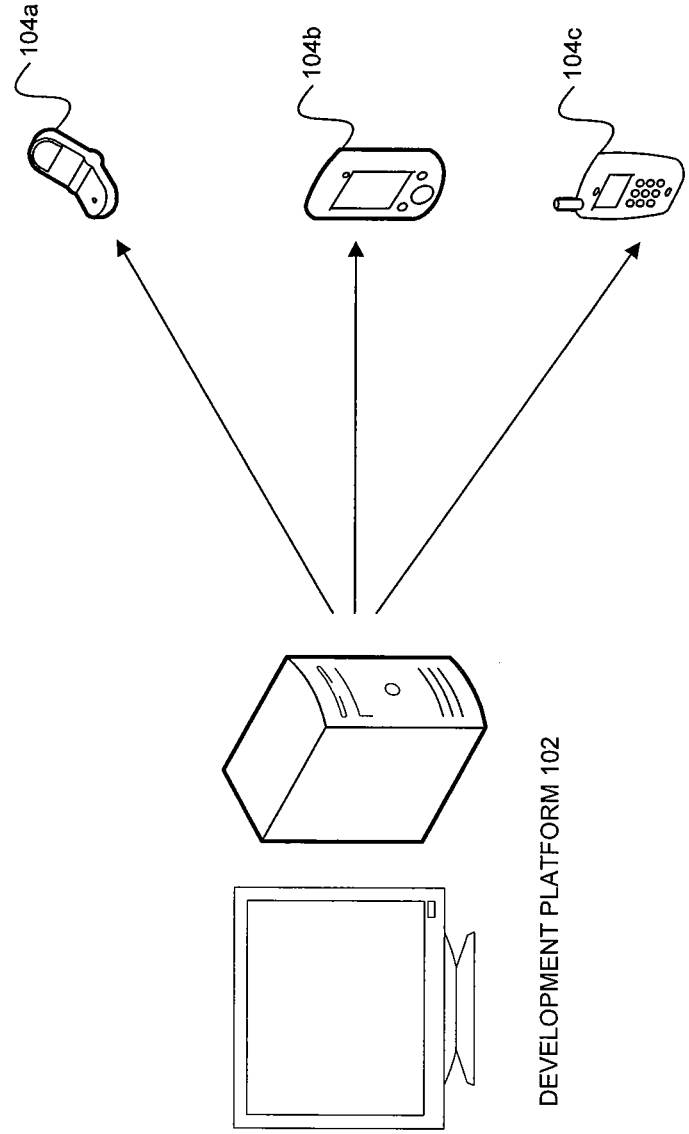
FIG. 1 is a software development project comprising a development platform and one or more deployment platforms, in accordance with an embodiment of the present invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

I. Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

FIG. 1 is a software development project 100 comprising a development platform 102 and one or more deployment platforms 104a-104c, in accordance with an embodiment of the present invention. In accordance with an embodiment of the present invention, a developer writes a software application on development platform 102. The software application is developed such that it is able to run on a target platform selected from the set of deployment platforms 104. Subsequently, a revised version of the software application is developed by modifying platform-specific aspects of the software application such that it is able to run on a second target platform selected from the set of deployment platforms 104. This process is described in greater detail herein with continued reference to FIG. 1

II. Development Framework

Figure 2:
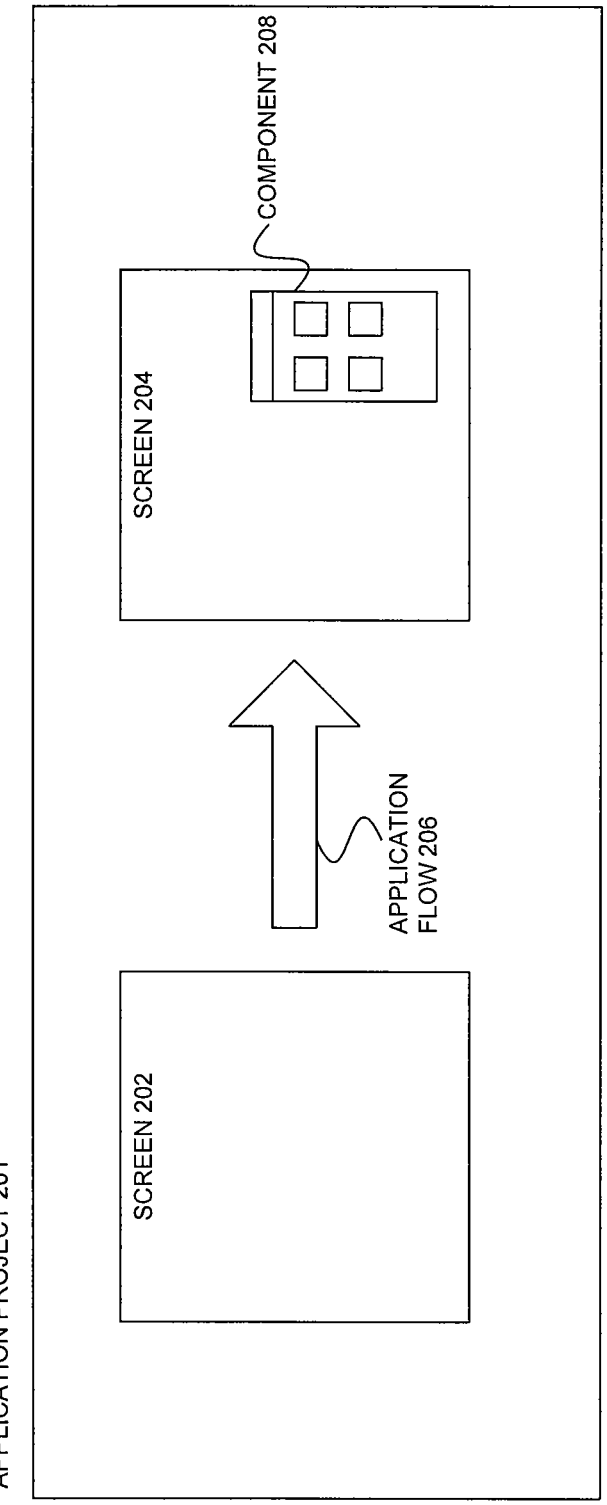
FIG. 2 is an example development framework, in accordance with an embodiment of the present invention.

FIG. 2 is an example development framework 200, in accordance with an embodiment of the present invention. Framework 200 defines an application project 201, which acts as a container for a software application under development, in accordance with an embodiment of the present invention. The project 201 comprises, in accordance with an additional embodiment of the present invention, one or more screens 202 and 204 that are displayed to a user of a deployment platform 104 running the software application. The project comprises, in accordance with a further embodiment of the present invention, an application flow 206 which defines the transitions between various screens 202 and 204 of the software application. Additionally, each screen 202 and 204 comprises components 208, in accordance with an embodiment of the present invention.

One skilled in the relevant arts will appreciate that the arrangement shown in framework 200 of FIG. 2 is presented by way of example, and not limitation. An application need not, for example, have any screens 202 and 204 in order to perform some function, nor a defined application flow 206 or components 208.

Figure 3:
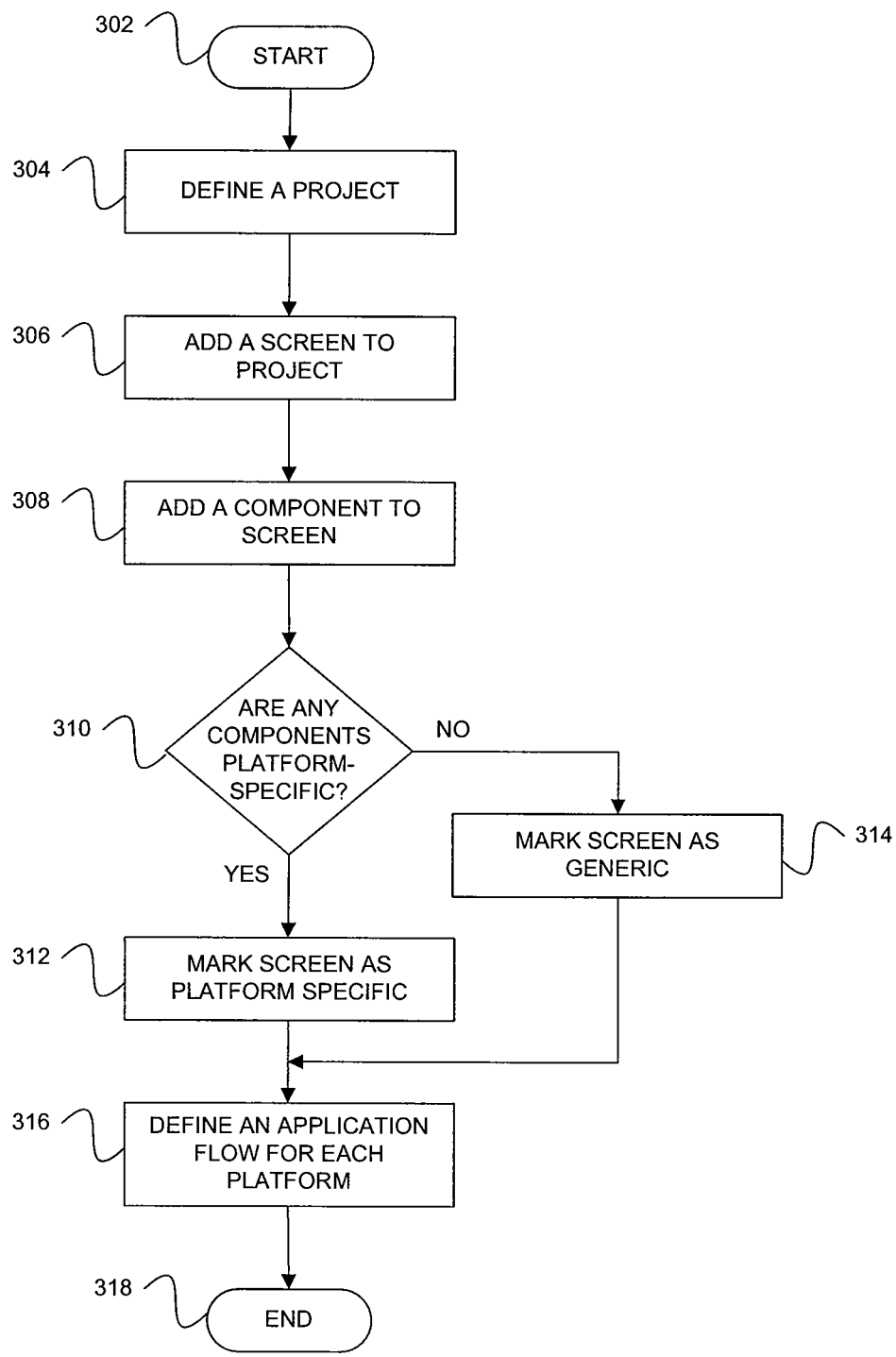
FIG. 3 is a flowchart illustrating steps by which a developer utilizes a development framework to create a software application, in accordance with an embodiment of the present invention.

FIG. 3 is a flowchart 300 illustrating steps by which a developer utilizes framework 200 to create a software application, in accordance with an embodiment of the present invention. The method begins at step 302 and proceeds to step 304 where a project is defined, in accordance with an embodiment of the present invention.

In accordance with an embodiment of the present invention, the project is defined by the selection of a pre-existing project. In accordance with a further embodiment of the present invention, the project is created at step 302. When the project is created, a developer optionally chooses one or more target platforms, corresponding to deployment platforms 104, on which the software application is targeted to run, in accordance with an embodiment of the present invention. For example, the developer is able to target deployment on the Windows Mobile platform developed by Microsoft Corporation of Redmond, Wash., the BlackBerry platform developed by Research In Motion of Waterloo, Ontario, and the Java ME platform designed by Sun Microsystems of Santa Clara, Calif.

Additionally, the developer is also able to set the development language for the project, in accordance with an embodiment of the present invention. In accordance with a further embodiment of the present invention, this language is a third generation language ("3GL") such as Java or C#. In accordance with an additional embodiment of the present invention, the language options available to the developer are based on the platforms selected as target platforms for deployment.

At step 306, the developer adds a screen, such as screens 202 and 204, to the project, in accordance with an embodiment of the present invention. In accordance with an embodiment of the present invention, the screen is added to the project by selecting a pre-existing screen. In accordance with a further embodiment of the present invention, the screen is created at step 306.

In accordance with an embodiment of the present invention, the screen is defined as either a generic (i.e., multi-platform) screen, or it is designated as targeted to one or more specific target platforms. In accordance with an additional embodiment of the present invention, the screen is created using a template.

With a screen defined, at step 308 the developer adds a component, such as component 208, to the screen, in accordance with an embodiment of the present invention. In accordance with an additional embodiment of the present invention, the developer selects the component from a palette and places the component on the screen. The developer is able to set properties for each control, such as, for example, the size of the control, whether it is enabled or disabled, whether to show or hide the control either statically by editing the properties when working with the control, or dynamically using procedural logic in the selected development language, in accordance with an embodiment of the present invention.

In accordance with an additional embodiment of the present invention, the developer is able to set properties for controls using fourth generation language ("4GL") programming, such as through the use of metadata, in order to retain any platform independence associated with the control. In accordance with a further embodiment of the present invention, the properties of the control are exposed to the selected 3GL development language, enabling the developer to create platform-specific code to manipulate the control.

In accordance with an embodiment of the present invention, when a control is manipulated using 3GL platform-specific code, the instance of the control, as well as the screen on which it is placed, are marked by the framework as targeted to a specific platform. This aids the verification tool, discussed below, in identifying platform-specific sections of code that should be modified when deploying the application on another target platform.

Certain controls have the ability to accept input, such as, for example, buttons, text input fields, and menus, in accordance with an embodiment of the present invention. In accordance with a further embodiment of the present invention, logic is defined to respond to the input using 4GL programming, the logic having built-in validation rules. By using 4GL code in this manner, the control can remain generic and platform-independent if originally designed as such. Alternatively, in accordance with an additional embodiment of the present invention, the selected 3GL development language can be used to respond to the inputs by interfacing with exposed 3GL hooks for the control. When a 3GL development language is used in this manner, the control is then marked as platform-specific, as well as the associated screen on which the control is placed.

At step 310, as previously disclosed, a determination is made as to whether any controls placed on the screen are platform-specific. This includes, for example, generic controls that have been extended with 3GL platform-specific code, or controls that are platform-specific by virtue of their design. If any of the components are platform-specific, then the screen itself is marked as platform-specific at step 312, otherwise the screen is marked as generic at step 314.

The developer subsequently defines an application flow, such as application flow 206, at step 316, in accordance with an embodiment of the present invention. An application flow defines the sequence of screens, such as screens 202 and 204, shown to a user. This application flow is defined, in accordance with an embodiment of the present invention, using 4GL code, which enables the overall application project, such as application project 201, to remain platform-independent if all screens used in an application flow are generic. Additionally, in accordance with another embodiment of the present invention, 3GL hooks are provided to enable a developer programming with a 3GL development language to write application flow logic in the 3GL development language.

One skilled in the relevant arts will appreciate that various combinations of the aforementioned components, to include the screens 202 and 204, component 208, application flow 206, and the application project 201 itself, can result in entirely generic applications or platform-specific applications. In accordance with an embodiment of the present invention, a plurality of screens for performing the same functionality is defined, each of the screens marked as platform-specific for a different target platform. In this embodiment, an application flow is defined for each target platform, the application flow comprising only the one platform-specific screen from the plurality of screens corresponding to the target platform associated with the application flow. The method then ends at step 318.

III. Validation And Verification

Figure 4:
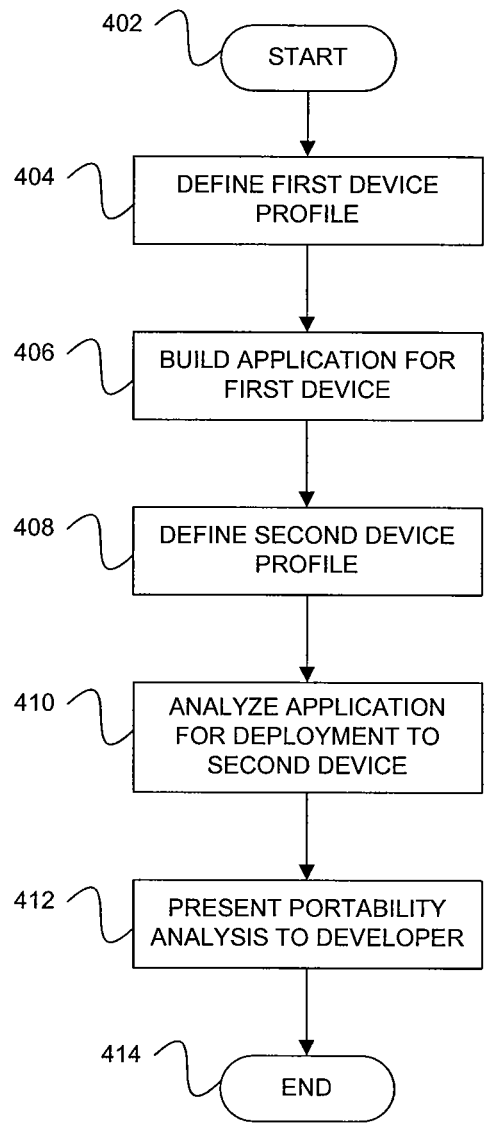
FIG. 4 is a flowchart illustrating steps by which a project is analyzed for porting to an additional mobile device, in accordance with an embodiment of the present invention.

FIG. 4 is a flowchart 400 illustrating steps by which a project created by the method of flowchart 300 of FIG. 3 is analyzed for porting to an additional mobile device, in accordance with an embodiment of the present invention. The method begins at step 402 and proceeds to step 404 where a profile for a first device is defined. One skilled in the relevant arts will appreciate that a profile for a device can be defined a number of ways, and the profile definition may be provided by the manufacturer of the device, a third party, or may need to be created by the developer in the process of software development, for example.

In accordance with an embodiment of the present invention, a device profile includes information regarding the capabilities of the target deployment platform, or mobile device. This includes, by way of example and not limitation, characteristics such as available APIs for the device, the form factor of the device, the operating system of the device, and the device's input and output capabilities such as, for example, the availability of a Bluetooth communication module.

At step 406, the developer builds an application targeted to the capabilities of the device identified by the first device profile of step 404. This process is accomplished by, in accordance with an embodiment of the present invention, following the methodology of flowchart 300 of FIG. 3.

When the developer desires to port the application targeted to the capabilities of the device identified by the first device profile of step 404 to a second device, where the second device has dissimilar capabilities to the first device, a second device profile is defined at step 408 for the second device.

At step 410, the application is analyzed for deployment to the second device. This is accomplished, in accordance with an embodiment of the present invention, by the performance of a portability check. In accordance with an embodiment of the present invention, the portability check determines the differences between the first device and second device by comparing the first device profile to the second device profile, and further determining whether the application relies on any of the capabilities of the first device which are absent or otherwise different in the second device. Moreover, the portability check identifies, in accordance with an embodiment of the present invention, the usage of any platform-specific components, screens, application flows, projects, or 3GL programming instructions, in accordance with an embodiment of the present invention. One skilled in the relevant arts will appreciate that the aforementioned comparisons are shown by way of example, not limitation, and that additional means for comparing the capabilities of devices, as well as usage of those capabilities by an application, may be substituted to achieve similar results.

When the above comparisons are determined, the resulting analysis, showing non-compatible aspects of the application, is presented to the developer at step 412. The method then ends at step 414.

IV. Extensibility

Figure 5:
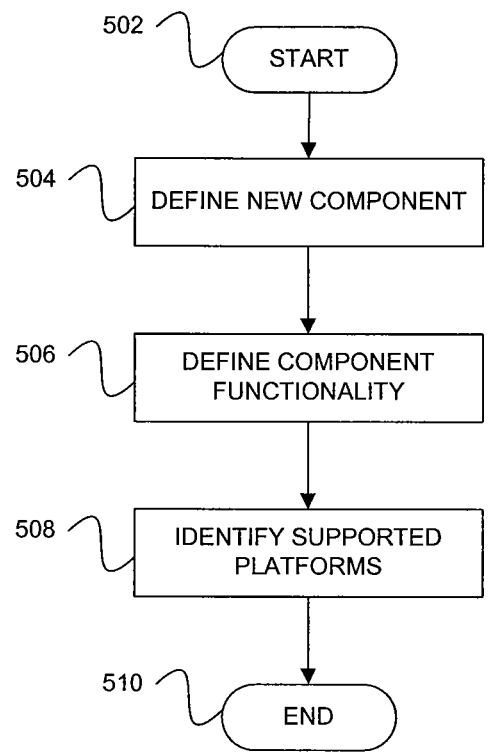
FIG. 5 is a flowchart illustrating steps by which user-created extensions are defined, in accordance with an embodiment of the present invention.

The framework described above allows for user-created extensions by the method outlined in flowchart 500 of FIG. 5, in accordance with an embodiment of the present invention. The method begins at step 502 and proceeds to step 504 where a new component is defined, in accordance with an embodiment of the present invention. The new component may be, by way of example and not limitation, a user interface object, an event handler, or a template.

To provide functionality to the component, a developer defines component functionality at step 506, in accordance with an embodiment of the present invention. This functionality can be defined through the use of either 4GL or 3GL programming, in accordance with a further embodiment of the present invention. Accordingly, at step 508, the platforms supported by the component are identified, in accordance with an additional embodiment of the present invention. By way of example, and not limitation, a component defined strictly using 4GL programming may be generic and therefore support all platforms, but a component defined using some amount of 3GL programming may render the component platform-specific, and the component would be identified accordingly. The method subsequently ends at step 510.

V. Debugging

In an embodiment, a developer can set breakpoints on a piece of code (e.g. built-in actions, user-defined code, external code, etc.) from development platform 102 and can launch a debugger. The debugger allows the developer to view and debug application data. Breakpoints are known to those skilled in the art and are used, for example, to test and debug programs by causing the programs to stop at scheduled intervals. This allows a developer to examiner the status of the programs in stages.

In an embodiment, a developer can set one or more tracking properties that generate output when an application runs on deployment platforms 104a-c (or any other emulator or device). As an example, pre-defined tracking properties are available to the developer at various levels, including but not limited to, device runtime sub-systems and device APIs.

VI. Exemplary Screen Designer

Figure 6:
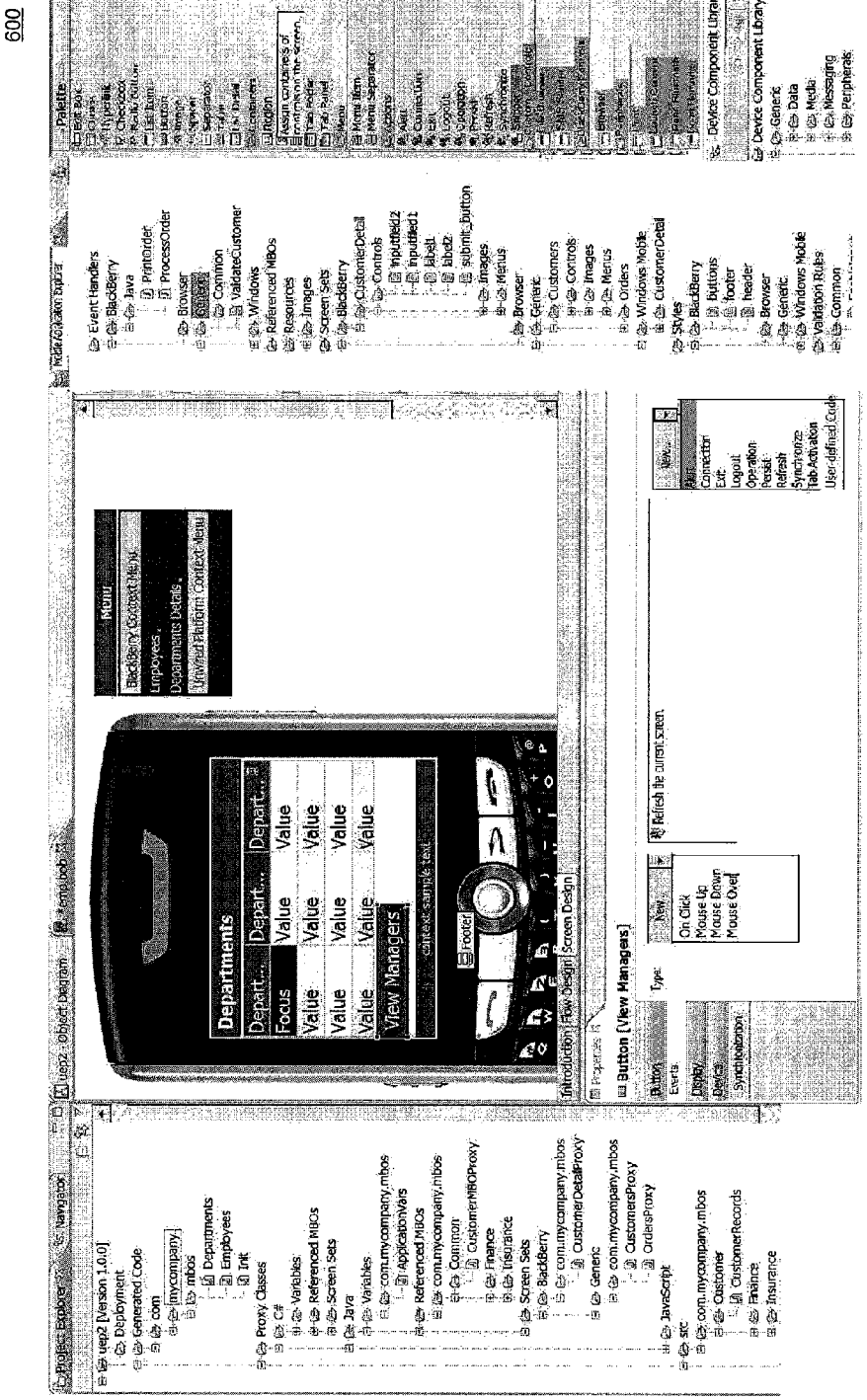
FIG. 6 illustrates a screen designer, in accordance with an embodiment of the present invention.

FIG. 6 illustrates screen designer 600, according to an embodiment of the invention. As an example, screen designer 600 can be used to develop and design screens 202 and 204.

In an embodiment, not intended to limit the invention, exemplary screen designer 600 allows a developer to develop support for:

Styles, user interface skins, control properties, and defining actions.
Multi-platform nature of an application.
Events definition.
Specific platform modes, and platform controls.
Platform-specific events on common and platform-specific controls.
Custom controls and their properties and events.

Quick preview on any available device for a target platform.

Screen cloning in a manner that it preserves generic and platform-compatible portions of the screen definition.

In an embodiment, screen designer 600 allows a developer to develop label text strings and images, and embed label text strings and images into dynamic elements (e.g. elements such as hyperlinks). Screen designer 600 may also include a properties view for controls to support new events and actions, custom controls, and adding user-defined code for events. Exemplary properties view 900 is described further below.

VII. Exemplary Flow Designer And Tool Palette

Figure 7A:
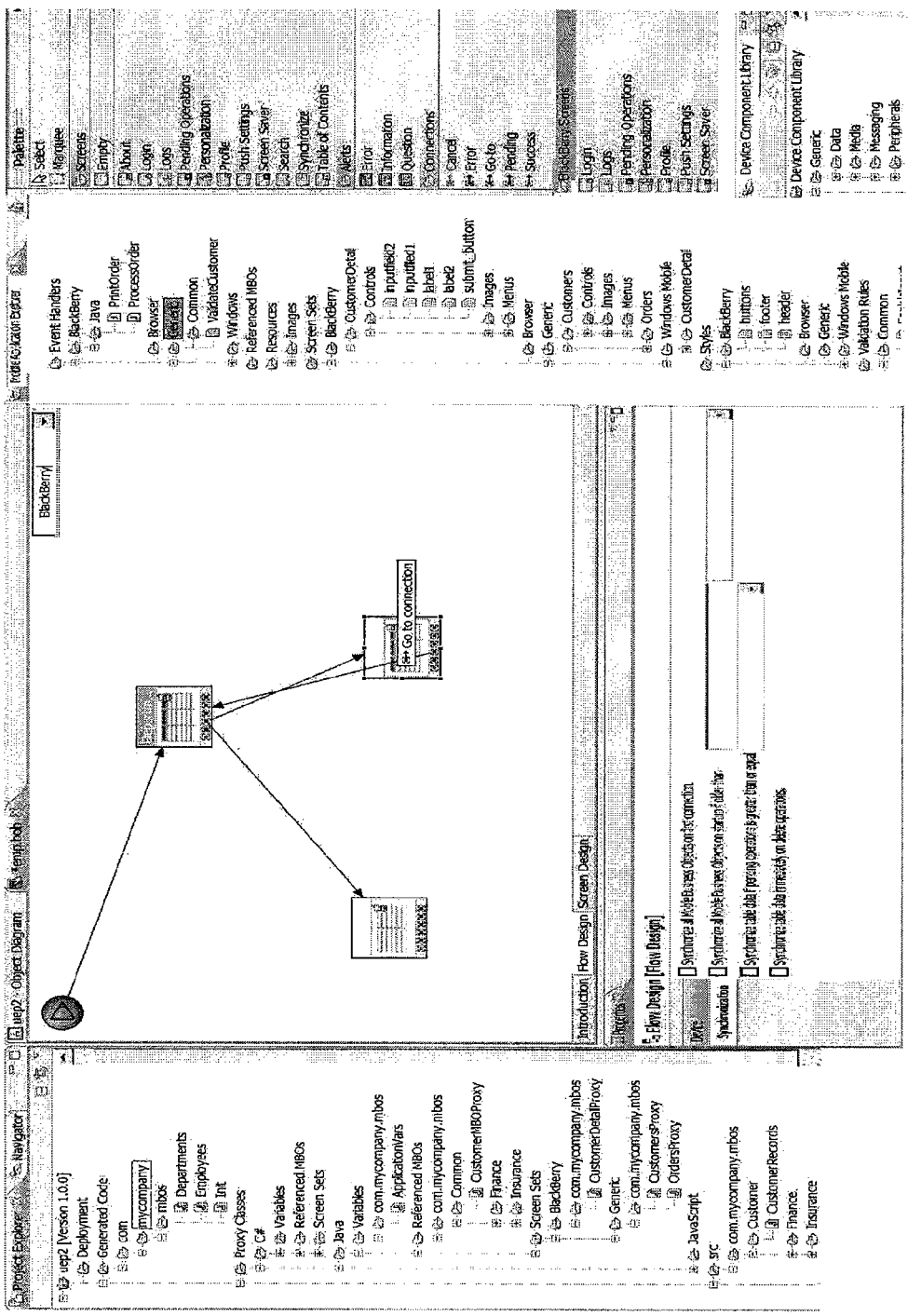
FIG. 7A illustrates a flow designer, in accordance with an embodiment of the present invention.

FIG. 7A illustrates flow designer 700, according to an embodiment of the invention. Flow designer 700 can be used to develop and design application flow 206. Flow designer 700 also supports platform-specific flow definition and addition of generic and platform-specific screens to an application or screen flow.

Figure 7B:
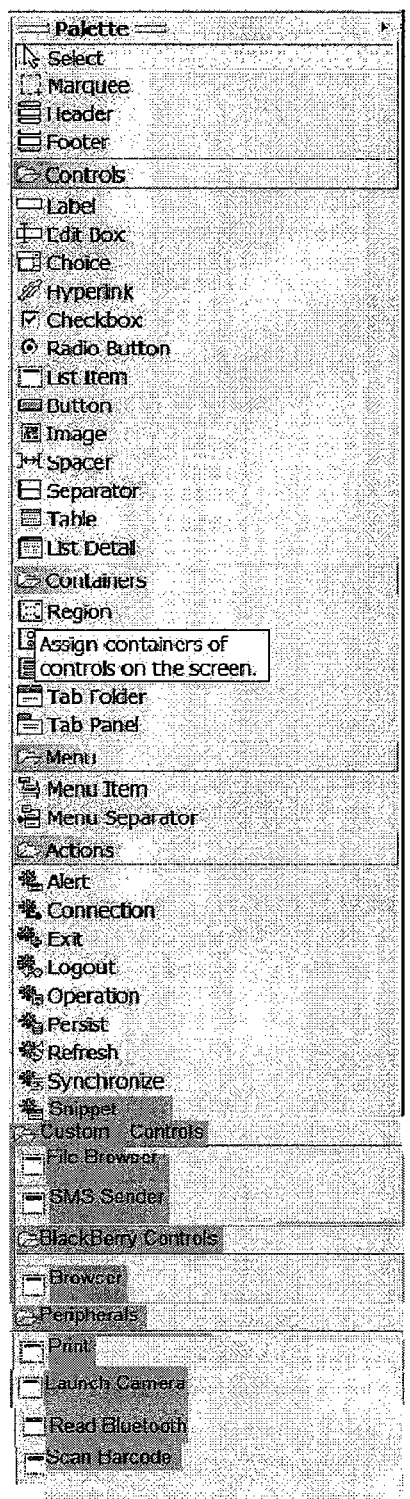
FIG. 7B illustrates a tool palette, in accordance with an embodiment of the present invention.

FIG. 7B illustrates tool palette 720, according to an embodiment of the invention. In an embodiment, tool palette 720 is associated with screen designer 600 and flow designer 700. In another embodiment, tool palette 720 can be separate from screen designer 600 and flow designer 700. A developer can select a control (e.g. button) from tool palette 720 and place the control on a screen. Furthermore, the developer is able to set properties for each control, such as, for example, the size of the control, whether it is enabled or disabled, and whether to show or hide the control. Properties for controls can be set by either statically editing the properties when working with the control, or dynamically using procedural logic in a selected development language.

In an embodiment, not intended to limit the invention, tool palette 720 provides support for:
Standard (or pre-defined) controls and screens.
Platform-specific controls and screens.
Controls for input and output peripheral interfaces (e.g. printers, barcode scanners, cameras and Bluetooth® devices.)
Adding custom controls and screens.

Figure 8A:
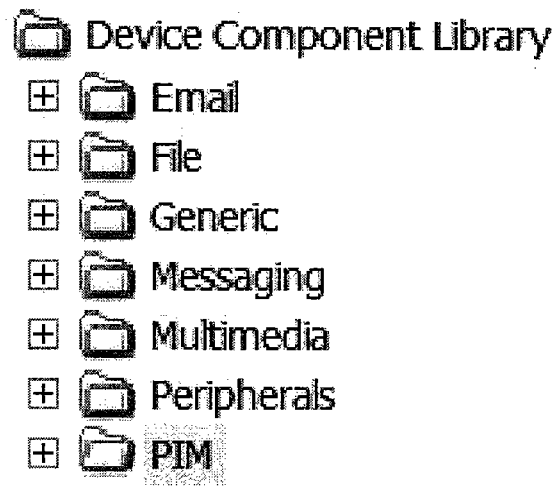
FIG. 8A illustrates a device component library, in accordance with an embodiment of the present invention.

VIII. Exemplary Device Component Library And Device Application Explorer View FIG. 8A illustrates device component library 800, according to an embodiment of the invention. As illustrated in FIG. 8A, device component library 800 can include a folder based representation of device components.

Figure 8B:
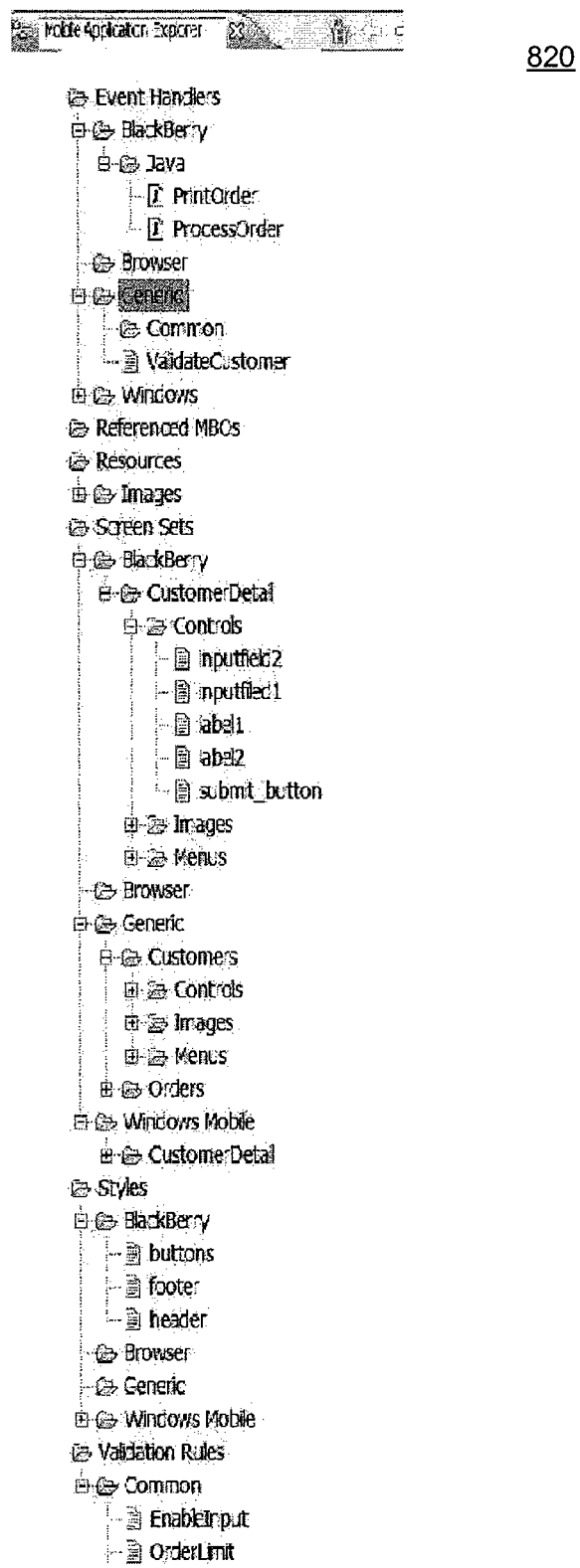
FIG. 8B illustrates a device application explorer view, in accordance with an embodiment of the present invention.

FIG. 8B illustrates device application explorer view 820, according to an embodiment of the invention. Device application explorer view 820 allows a developer to browse existing application metadata. Application metadata can include screen groups, screens, variables, controls and user-defined event codes. Device application explorer view 820 also allows a developer to perform various development actions (e.g. double-click open, create, modify, delete) and drag and drop user-interface elements to screen designer 600 (or flow designer 700).

IX. Exemplary Properties View

Figure 9:
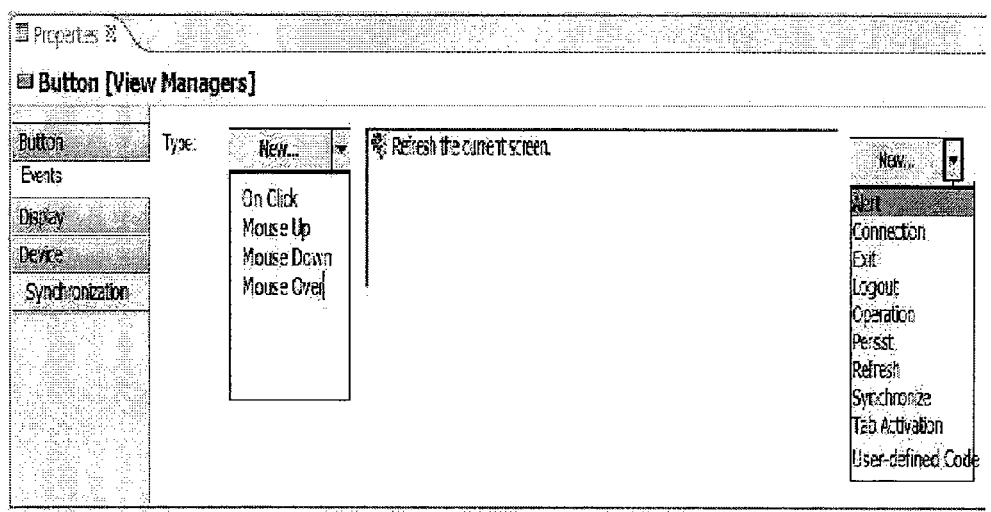
FIG. 9 illustrates a properties view, in accordance with an embodiment of the present invention.

FIG. 9 illustrates properties view 900, according to an embodiment of the invention. A developer can use properties view 900 to define behavior of controls and user-interface elements associated with screens 202 and 204. A developer can also use properties view 900 to define events associated with the controls. In an embodiment, each control can have a list of supported events. Events can be pre-defined for built-in standard controls. Some events can be added to standard controls when a developer chooses a specific platform. Events are also available on platform specific controls.

In an embodiment, an event handler can be implemented using a programming language's pre-build actions (e.g. 4GL pre-build actions). An event handler can also be implemented using user-defined code depending on one or more language choices (e.g. Java and C#) available for a target platform.

X. Validation Rules

In an embodiment, validation rules are functions used in implementing flow, screen layout functions and data validation. As an example, validation can be implemented using pre-defined built-in rules. Validation rules can include data type check, range check (for numbers), enumerated values check, limit check, required check, digits check (for SSN, ISBN, etc.) and a consistency check. Validation rules can also be defined as expressions or functions, including but not limited to user-defined code.

In an embodiment, validation rules can be used in event handler implementation. Validation rules can also be used to choose and apply styles dynamically and can be invoked from any user-defined code such as event handlers, external code or APIs.

XI. Native Code Editors

In an embodiment, native code editors associated with development platform 102 can access an application's metadata. As an example, not intended to limit the invention, native code editors, associated with development platform 102, offer developers Java® editing support with application metadata awareness via generated proxy Java classes. Embodiments of native code editors also offer C# editing support with application metadata awareness via generated proxy C# classes. Native code editors may also offer support for other programming languages. Furthermore, embodiments also support third-party and custom API integration via runtime libraries. As an example, such API integration can be accomplished by setting an application project's properties for each target platform.

XII. Proxy Class Generation

Embodiments of the invention can generate proxy classes at the time of application building. Proxy classes, for example, are wrappers used in absence of actual classes. Proxy classes can provide application metadata awareness in native programming code editors.

In an embodiment, proxy classes are automatically generated by development platform 102 during screen and flow design actions, including but not limited to, adding new screens and controls on a screen. Development platform 102 can also offer a context menu and dialog for batch generation of proxy classes.

XIII. Example Computer System Implementation

Figure 10:
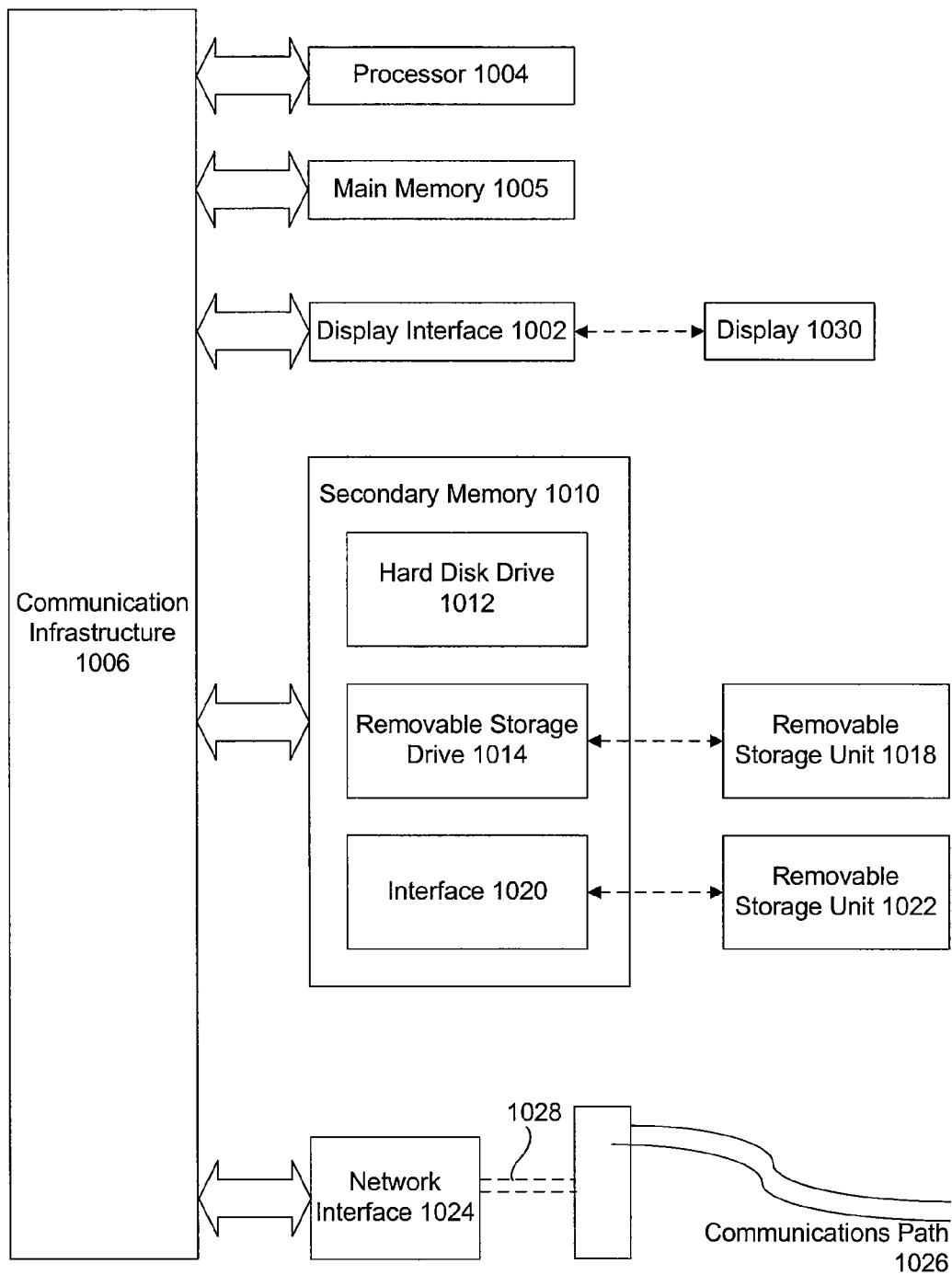
FIG. 10 depicts an example computer system in which embodiments of the present invention may be implemented.

Various aspects of the present invention can be implemented by software, firmware, hardware, or a combination thereof. FIG. 10 illustrates an example computer system 1000 in which the present invention, or portions thereof, can be implemented as computer-readable code. For example, the methods illustrated by flowcharts 300 of FIG. 3, 400 of FIG.

4, and 500 of FIG. 5, can be implemented in system 1000. Various embodiments of the invention are described in terms of this example computer system 1000. After reading this description, it will become apparent to a person skilled in the relevant art how to implement the invention using other computer systems and/or computer architectures. Computer system 1000 includes one or more processors, such as processor 1004. Processor 1004 can be a special purpose or a general purpose processor. Processor 1004 is connected to a communication infrastructure 1006 (for example, a bus or network).

Computer system 1000 also includes a main memory 1008, preferably random access memory (RAM), and may also include a secondary memory 1010. Secondary memory 1010 may include, for example, a hard disk drive 1012, a removable storage drive 1014, and/or a memory stick. Removable storage drive 1014 may comprise a floppy disk drive, a magnetic tape drive, an optical disk drive, a flash memory, or the like. The removable storage drive 1014 reads from and/or writes to a removable storage unit 1018 in a well known manner. Removable storage unit 1018 may comprise a floppy disk, magnetic tape, optical disk, etc. which is read by and written to by removable storage drive 1014. As will be appreciated by persons skilled in the relevant art(s), removable storage unit 1018 includes a computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1000.

Computer system 1000 may also include a communications interface 1024. Communications interface 1024 allows software and data to be transferred between computer system 1000 and external devices. Communications interface 1024 may include a modem, a network interface (such as an Ethernet card), a communications port, a PCMCIA slot and card, or the like. Software and data transferred via communications interface 1024 are in the form of signals which may be electronic, electromagnetic, optical, or other signals capable of being received by communications interface 1024. These signals are provided to communications interface 1024 via a communications path 1026. Communications path 1026 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 1018, removable storage unit 1022, and a hard disk installed in hard disk drive 1012. Signals carried over communications path 1026 can also embody the logic described herein. Computer program medium and computer usable medium can also refer to memories, such as main memory 1008 and secondary memory 1010, which can be memory semiconductors (e.g. DRAMs, etc.). These computer program products are means for providing software to computer system 1000.

Computer programs (also called computer control logic) are stored in main memory 1008 and/or secondary memory 1010. Computer programs may also be received via communications interface 1024. Such computer programs, when executed, enable computer system 1000 to implement the present invention as discussed herein. In particular, the computer programs, when executed, enable processor 1004 to implement the processes of the present invention, such as the steps in the methods illustrated by flowcharts 300 of FIG. 3, 400 of FIG. 4, and 500 of FIG. 5, discussed above. Accordingly, such computer programs represent controllers of the computer system 1000. Where the invention is implemented using software, the software may be stored in a computer program product and loaded into computer system 1000 using removable storage drive 1014, interface 1020, hard drive 1012 or communications interface 1024.

The invention is also directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnoiogical storage device, etc.), and communication mediums (e.g., wired and wireless communications networks, local area networks, wide area networks, intranets, etc.).

XIV. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for developing a portable software application, comprising:
  defining a software development project configured to be executed on a plurality of client platforms during application development;
  adding a screen to the project during the application development, wherein the screen is defined as one of a generic screen and a platform-specific screen;
  adding a component to the screen during the application development, wherein the component is defined as one of a generic component and a platform-specific component;
  redefining the screen as a platform-specific screen during the application development when the screen is defined as a generic screen and one or more platform-specific components have been added to the screen;
  defining an application flow from the screen to one or more additional screens during the application development,
  wherein a first device profile comprises capabilities of a first target deployment platform associated with the platform-specific component,
  wherein a second device profile comprises capabilities of a second target deployment platform;

analyzing the application for deployment to the second target deployment platform based on the second device profile; and presenting a portability analysis to a user based on the analyzing.

2. The method of claim 1, wherein the project defining includes setting a development language for the project.

3. The method of claim 1, wherein the screen is added to the project by selecting a pre-existing screen.

4. The method of claim 1, wherein the screen is created using a template.

5. The method of claim 1, wherein the component is added to the screen by selecting the component from a palette.

6. The method of claim 1, further comprising setting properties for one or more controls associated with the component.

7. The method of claim 6, further comprising determining if the controls are platform specific.

8. The method of claim 1, wherein the project defining includes defining a sequence of screens presented to a user.

9. The method of claim 1, wherein the analyzing includes performing a portability check.

10. The method of claim 9, wherein the portability check comprises:
comparing the first device profile to the second device profile to determine one or more differences between the first device and the second device;
determining whether the portable software application relies on any capabilities in the first device that are absent or otherwise different in the second device; and
identifying usage of the one or more platform specific components.

11. The method of claim 1, further comprising providing functionality to the component by identifying platforms supported by the component.

12. The method of claim 1, wherein the portability analysis comprises an indication of differences between capabilities of the first target deployment platform and the second target deployment platform.

13. The method of claim 12, wherein the indication of differences includes an indication that the platform-specific component is associated with the first target deployment platform.

14. A non-transitory computer usable medium having control logic stored thereon, that when executed by a processor, causes the processor to perform operations to develop a portable software application, the operations comprising:
defining a software development project configured to be executed on a plurality of client platforms during application development;
adding a screen to the project during the application development, wherein the screen is defined as one of a generic screen and a platform-specific screen;
adding a component to the screen during the application development, wherein the component is defined as one of a generic component and a platform-specific component;
redefining the screen as a platform-specific screen during the application development when the screen is defined as a generic screen and one or more platform-specific components have been added to the screen; and
defining an application flow from the screen to one or more additional screens during the application development,
wherein a first device profile comprises capabilities of a first target deployment platform associated with the platform-specific component,
wherein a second device profile comprises capabilities of a second target deployment platform;
analyzing the application for deployment to the second target deployment platform based on the second device profile; and
presenting a portability analysis to a user based on the analyzing.

15. The non-transitory computer usable medium of claim 14, the operations further comprising:
performing a portability check.

16. The non-transitory computer usable medium of claim 15, wherein the portability check comprises:
comparing the first device profile to the second device profile to determine one or more differences between the first device and the second device;
determining whether the portable software application relies on any of capabilities in the first device that are absent or otherwise different in the second device; and
identifying usage of the one or more platform specific components.

17. A system for developing a portable software application, comprising:
one or more processors;
a project defining module configured to define, using the one or more processors, a software development project configured to be executed on a plurality of client platforms during application development;
a screen adding module configured to add, using the one or more processors, a screen to the project during the application development, wherein the screen is defined as one of a generic screen and a platform-specific screen;
a component adding module configured to add, using the one or more processors, a component to the screen during the application development, wherein the component is defined as one of a generic component and a platform-specific component;
a redefining module configured to redefine, using the one or more processors, the screen as a platform-specific screen during the application development when the screen is defined as a generic screen and one or more platform-specific components have been added to the screen; and
an application flow defining module configured to define, using the one or more processors, an application flow from the screen to one or more additional screens during the application development,
wherein a first device profile comprises capabilities of a first target deployment platform associated with the platform-specific component,
wherein a second device profile comprises capabilities of a second target deployment platform; and
a portability module configured to analyze the application for deployment to the second target deployment platform based on the second device profile, and
present a portability analysis to a user based on the analyzing.

18. The system of claim 17, wherein the project defining module is configured to set a development language for the project.

19. The system of claim 17, wherein the screen adding module is configured to add the screen to the project by selecting a pre-existing screen.

20. The system of claim 17, wherein the component adding module is configured to add the component to the screen by selecting the component from a palette.

* * * * *